Patented Jan. 1, 1946

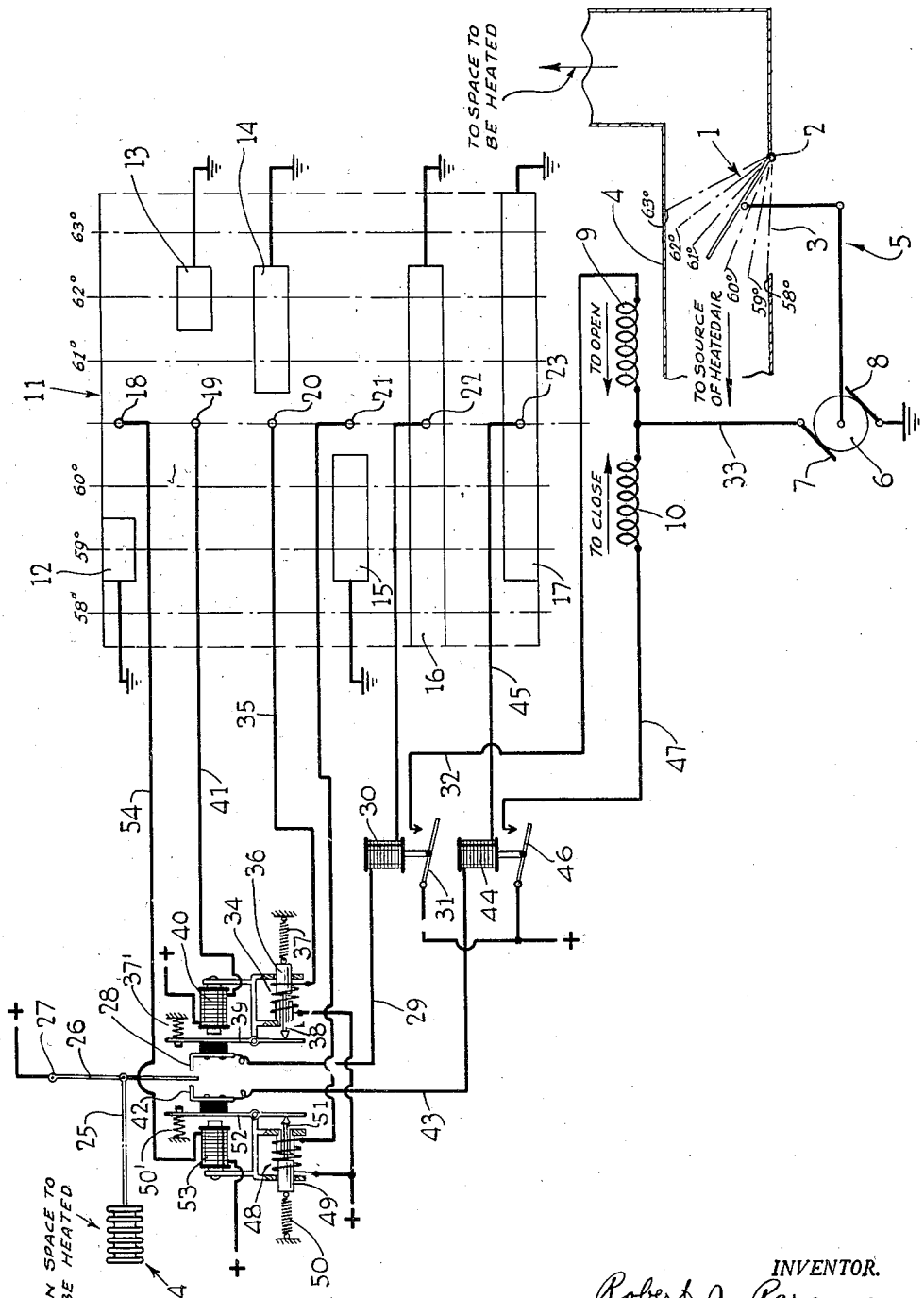

2,392,290

UNITED STATES PATENT OFFICE 2,392,290

HEATING CONTROL

Robert J. Parsons, Schenectady, N. Y., assignor to Consolidated Car Heating Company, Inc., Albany, N. Y., a corporation of New York Application June 23, 1944, Serial No. 541,825

4 Claims. (Cl. 236—76)

This invention relates to heating and ventilating, particularly heating and ventilating of a vehicle, such as a bus or street car.

A principal object of this invention is the provision of a construction and arrangement whereby heated air flowing in a conduit to a space to be heated and ventilated may be diverted to a bypass, more or less, by a valve or damper which may be regulated minutely to a plurality of positions.

Other objects and advantages will appear as the description of the particular physical embodiment selected to illustrate the invention progresses and novel features will be particularly pointed out in the appended claims.

In describing the particular physical embodiment selected to illustrate the invention, reference will be had to the accompanying drawing, consisting of a single schematic or diagrammatic view, and to the characters of reference thereon.

Numeral 1 designates a valve or damper pivoted at 2 and adapted to completely close the opening 3 in a duct 4 or to completely close the duct 4.

The duct 4 connects to a source of heated air at one end and at the other end leads to a space to be heated or ventilated.

The damper 4 is operated by the linkage 5 connected to the armature of a motor 6 having brushes 7 and 8 and field coils 9 and 10.

The field coil 9 is so wound on the motor as to cause the motor to revolve in such direction as to open the damper, that is, to move the damper in a direction so that the by-pass 3 will be opened more or less. The field coil 10 is so wound upon the motor that it causes the motor armature to revolve in such direction as to close the damper 1, that is, to move the damper so as to close the by-pass 3 more or less.

There is also provided an insulating drum 11 rotatable synchronously with the damper. This drum has metallic segments 12, 13, 14, 15, 16 and 17 thereon, each being connected to a common wire return or ground.

18, 19, 20, 21, 22 and 23 designate metallic brushes bearing upon the drum 11 and at times contacting the metallic segments thereon to complete circuits to be hereinafter described.

24 designates a Sylphon or bellows type thermostatic device positioned in the space to be heated or ventilated and responding to the changes in temperature therein. I do not mean to exclude by a showing of the thermostatic device directly in the space to be heated and of the Sylphon or bellows type, the use of a temperature responsive device positioned in the space to be heated and a connection therebetween and a bellows or Sylphon positioned at a more convenient place whereby the changes in temperature in the space to be heated are reflected by the remote Sylphon or bellows.

All of the parts shown in the drawing are assumed to be in the position which they would be in if the temperature in the space to be heated were 60½° F.

If the temperature to which bellows 24 is exposed rises so that it becomes 61°, then the bellows 24 will expand pushing link 25 to the right, as viewed in the figure. This will cause switch arm 26 pivoted at 27 to contact point 28. When this contact is made a circuit will be formed in which current will flow as follows: from the positive terminal of a source of potential, pivot 27, switch arm 26, point 28, wire 29, relay coil 30, brush 22, segment 16, and thence to common or the negative terminal of the source. Current flowing in the above trace path will cause the relay armature 31 to be raised so that a circuit will be formed in which current will flow as follows: positive terminal of a source of potential, relay armature 31, wire 32, opening field coil 9, wire 33, brush 7, armature 6, brush 8, and to the negative terminal of the source. Current flowing in the above trace path will cause the armature 6 to rotate and through linkage 5 move the damper 1 to the 61° position and synchronously move drum 11. When metallic segment 14 moves under brush 20 a circuit will be formed as follows: positive terminal of the source of potential, winding 34 of a solenoid, wire 35, brush 20, metallic segment 14 and to the negative terminal of the source. Current flowing in the above traced path energizing solenoid winding 34 will cause core 36 to be drawn in against the tension of the spring 37 and strut 38 exerting a pressure in the direction to the left, as viewed in the figure, will cause pivoted armature 39 to move, carrying point 28 with it so as to break contact with pivoted switch arm 26 so that relay 30 will be deenergized and so the opening field coil will be deenergized and the damper will be left in the 61° position.

If the temperature in the space to be heated rises to 62°, then switch arm 26 will again contact point 28 and again relay 30 will be energized and opening field coil 9 will again be energized to cause the motor to rotate and move the damper to the 62° position. When the damper reaches the 62° position, brush 19 contacts metallic segment 13 and a circuit will be formed as follows: positive terminal of a source of potential, relay winding 40, wire 41, brush 19, metallic segment 13, and to the negative terminal of the source. Current flowing in the above trace path will energize the relay having the coil 40 and will move armature 39 to the right, as viewed in the figure, thus again breaking contact between switch arm 26 and point 28. This breaking of contact between switch arm 26 and point 28 will again deenergize relay coil 30 and opening coil 9 and the damper will remain in the 62° position.

If the temperature in the space to be heated, now rises to 63°, switch arm 26 will again contact point 28 and again relay coil 30 will be energized and opening coil 9 will be energized to move damper 1 to the 63° position. When the damper reaches the 63° position, brush 22 moves out of contact with metallic segment 16 and so relay coil 30 will become deenergized and the damper will be left in the 63° position.

With all of the parts in the position which they have assumed, as hereinbefore described with the damper in the 63° position, if the temperature in the space to be heated falls, then switch arm 26 will move toward the left, as viewed in the figure. It will continue moving to the left as the temperature falls to 62°, 61°, 60½° and not until it falls to 60° will any change in the device take place. When switch arm 26 assumes that position which it is intended to assume when the temperature of the space to be heated falls to 60°, then switch arm 26 will contact point 42 and a circuit will be formed as follows: positive terminal of a source of potential, switch arm 26, point 42, wire 43, relay coil 44, wire 45, brush 23, metallic segment 17 and thence to the negative terminal of the source. Current flowing in the above traced path will cause relay armature 46 to be raised thus forming a circuit as follows: positive terminal of a source of potential, relay armature 46, wire 47, closing field 10, wire 33, brush 7, armature 6, brush 8 and to the negative terminal of the source. Current flowing in the above traced path will cause the armature 6 to move and through linkage 5 move damper 1 from the 63° position to the 60° position. When it reaches the 60° position brush 21 will contact metallic segment 15 and form a circuit as follows: positive terminal of a source of potential, solenoid winding 48, wire 49, brush 21, metallic segment 15, and to the negative terminal of the source. Current flowing in the above traced path will cause solenoid core 49 to be moved to the right, as viewed in the figure, against the tension of spring 50 and through strut 51 will move pivoted armature 52 so that point 42 is moved out of contact with switch arm 26, thus breaking the circuit of relay coil 44 so that the motor will stop and the damper 1 will be left in the 60° position.

If the temperature in the space to be heated further falls to 59°, then switch arm 26 will again contact point 42 and will again energize relay coil 44 and again cause the closing field to operate the damper to the 59° position. When the damper reaches the 59° position, brush 18 contacts metallic segment 12 and a circuit is formed as follows: positive terminal of a source of potential, relay coil 53, wire 54, brush 18, metallic segment 12 and to the negative terminal of the source. Current flowing in the above trace path will draw the armature 52 together with the point 42 away from switch arm 26 and so break the circuit of the relay coil 44 so that the damper 1 will be left in the 59° position.

If now the temperature in the space to be heated falls to 58°, switch arm 26 will again contact point 42 and again energize relay coil 44 and cause the closing field coil to be energized and the motor to move damper 1 to the 58° position. When the damper reaches the 58° position, brush 23 is no longer in contact with metallic segment 17 so that relay coil 44 becomes deenergized, so that the damper is left in the 58° position.

As the damper moved from the 63° position toward and to the 58° position, relay coil 40 was deenergized in passing from the 62° position to the 61° position because brush 19 moved out of contact with the metallic segment 13, and as the damper moved from the 61° position to the 60½° position, the solenoid 34 became deenergized by brush 20 moving out of contact with the metallic segment 14, so that point 28 would be in the position which it was assumed to be in when all parts were in the 60½° position.

If now the temperature in the space to be heated rises, no parts will change except the switch arm 26 which will move gradually to the right, as viewed in the figure, until the switch arm 26 again contacts point 28, whereupon the same operations will take place as the temperature increases as has been hereinbefore described.

When switch point 26 does again contact point 28 and move the damper from the 58° position to the 61° position, solenoid 48 will become deenergized by brush 21 moving out of contact with metallic segment 15 and relay coil 53 will become deenergized by brush 18 moving out of contact with metallic segment 12, thus restoring solenoid core 49 and relay armature 52 to the position as shown in the figure.

From the hereinbefore given description it will also be apparent that if the temperature in the space to be heated has risen to any degree including 61° and above, that if the temperature then falls, no change will take place in the positioning of the parts until the temperature falls to 60°.

It will also be observed that if the temperature has fallen to 60° or below, that if it then rises, no change in the parts will take place until it has reached 61°.

Although I have particularly shown and described a reversible motor of the type in which there are separate field coils, one for rotation in one direction and the other for rotation in the other direction, nevertheless, I desire to have it understood that I do not exclude the use of other well known types of reversible motors.

Although I have shown the switch arm 26 as a simple pivoted arm, nevertheless I desired to have it understood that I do not mean to exclude the use of well-known snap-action switch arms.

From the hereinbefore given description, it will appear that I have provided a system in which I may control a damper in connection with a duct supplied from a source of heated air and communicating with a space to be heated in such a way that when the temperature of the space to be heated requires such action, I may by-pass a portion of the heated air flowing in the duct so that it does not reach the space to be heated, and that when the temperature of the space to be heated requires it, I may allow all or certain portions of the volume of heated air to flow to the space to be heated thereby regulating the temperature of the space to be heated.

It will also be observed that my method of operations is such that I do not keep the damper constantly fluctuating backward and forwards, that is toward open and toward closing position. I keep the damper fully open when the space to be heated is at a maximum temperature until the temperature in the space to be heated falls a substantial amount. On the other hand, after I have fully closed the damper to allow the full volume of heated air to reach the space to be heated, I do not move the damper toward open position until there has been a substantial rise of the temperature in the space to be heated, that is, from 58° to 61°.

If desired, springs 37' and 50' may be used in addition to springs 37 and 50, or as an alternative.

Although I have particularly described one particular physical embodiment of the idea of means underlying my invention and explained the principle and construction thereof, nevertheless, I desire to have it understood that the form selected is merely illustrative but does not exhaust the possible physical embodiments of the idea of means underlying my invention.

What I claim as new and desire to secure by Letters Patent of the United States is:

1. In a heating and ventilating system, in combination: a thermostatic device positioned in a space to be heated; a source of heated air, a duct formed with an opening in its side and extending from the source of heated air to the space to be heated; a damper in the duct adapted to be moved to a plurality of positions to close the by-pass wholly or partially and to close or to open the duct wholly or partially; a motor having an armature and an opening field winding and a closing field winding; connections between the armature and the damper whereby the damper is operated by the armature; an insulating drum mechanically connected to and oscillatable with the armature, said drum bearing a plurality of spaced metallic segments; electrical conducting brushes positioned to contact said segments in definite oscillated positions thereof; an opening field relay and a closing field relay; a circuit closing arm connected to and movable by said thermostatic device; two contact points, one positioned on one side of said circuit closing arm and the other positioned on the other side thereof; a source of electrical potential and conductors connecting it with the motor, the metallic segments, electrical conducting brushes, the relays, contact points and circuit closing arms whereby when the circuit closing arm is moved in one direction the damper is moved toward open position and when moved in the other direction the damper is moved toward closed position and means to prevent further movement of the damper after it has assumed a position corresponding to the then position of the switch arm.

2. In a heating and ventilating system, in combination: a thermostatic device positioned in a space to be heated; a source of heated air; a duct formed with an opening in its side and extending from the source of heated air to the space to be heated; a damper in the duct adapted to be moved to a plurality of positions to close the by-pass wholly or partially and to close or to open the duct wholly or partially; a motor having an armature and an opening field winding and a closing field winding; connections between the armature and the motor whereby the damper is operated by the armature; an insulating drum mechanically connected to and oscillatable with the armature, said drum bearing a plurality of spaced metallic segments; electrical conducting brushes positioned to contact said segments in definite oscillated positions thereof; an opening field relay and a closing field relay; a circuit closing arm connected to and movable by said thermostatic device; two contact points, one positioned on one side of said circuit closing arm and the other positioned on the other side thereof; a source of electrical potential and conductors connecting the several devices whereby when the circuit closing arm is moved in one direction the damper is moved toward open position and when moved in the other direction the damper is moved toward closed position, means to prevent further movement of the damper after it has assumed a position corresponding to the then position of the switch arm, two centrally pivoted levers, one bearing one contact and the other bearing the other contact; two pairs of electro-magnetic devices, one pair cooperating with one pivoted lever and one with the other; one of each pair positioned to act on its associated pivoted lever above the pivot and one of each pair positioned to act on its associated pivoted lever below the pivot and both positioned and connected to move the pivoted lever above the pivot in the same direction away from the circuit closing arm and means for energizing said electro-magnetic devices, one pair when the damper is being opened and the other pair when the damper is being closed at predetermined positions of the damper.

3. In a heating and ventilating system, in combination: a thermostatic device positioned in a space to be heated; a source of heated air, a duct formed with an opening in its side and extending from the source of heated air to the space to be heated; a damper in the duct adapted to be moved to a plurality of positions to close the by-pass wholly or partially and to close or to open the duct wholly or partially; a motor having an armature and an opening field winding and a closing field winding; connections between the armature and the motor whereby the damper is operated by the armature; an insulating drum mechanically connected to and oscillatable with the armature, said drum bearing a plurality of spaced metallic segments; electrical conducting brushes positioned to contact said segments in definite oscillated positions thereof; an opening field relay and a closing field relay; a circuit closing arm connected to and movable by said thermostatic device; two contact points, one positioned on one side of said circuit closing arm and the other positioned on the other side thereof; a source of electrical potential and conductors connecting the several devices whereby when the circuit closing arm is moved in one direction the damper is moved toward open position and when moved in the other direction the damper is moved toward closed position, means to prevent further movement of the damper after it has assumed a position corresponding to the then position of the switch arm, two centrally pivoted levers, one bearing one contact and the other bearing the other contact; two pairs of electro-magnetic devices, one pair cooperating with one pivoted lever and one with the other; one of each pair positioned to act on its associated pivoted lever above the pivot and one of each pair positioned to act on its associated pivoted lever below the pivot and both positioned and connected to move the pivoted lever above the pivot in the same direction away from the circuit closing arm and means for energizing an electro-magnetic device acting below the pivot of one pair when the damper has reached a first predetermined position beyond the mid-position in opening and to energize the other electro-magnetic device of the same pair when the damper has reached a second predetermined position in opening.

4. In a heating and ventilating system, in combination: a thermostatic device positioned in a space to be heated; a source of heated air, a duct formed with an opening in its side and extending from the source of heated air to the space to be heated; a damper in the duct adapted to be moved to a plurality of positions to close the by-pass wholly or partially and to close or to open the duct wholly or partially; a motor having an armature and an opening field winding and a closing field winding; connections between the armature and the motor whereby the damper is operated by the armature; an insulating drum mechanically connected to and oscillatable with the armature, said drum bearing a plurality of spaced metallic segments; electrical conducting brushes positioned to contact said segments in definite oscillated positions thereof; an opening field relay and a closing field relay; a circuit closing arm connected to and movable by said thermostatic device; two contact points, one positioned on one side of said circuit closing arm and the other positioned on the other side thereof; a source of electrical potential and conductors connecting the several devices whereby when the circuit closing arm is moved in one direction the damper is moved toward open position and when moved in the other direction the damper is moved toward closed position, means to prevent further movement of the damper after it has assumed a position corresponding to the then position of the switch arm, two centrally pivoted levers, one bearing one contact and the other bearing the other contact; two pairs of electro-magnetic devices, one pair cooperating with one pivoted lever and one with the other, one of each pair positioned to act on its associated pivoted lever above the pivot and one of each pair positioned to act on its associated pivoted lever below the pivot and both positioned and connected to move the pivoted lever above the pivot in the same direction away from the circuit closing arm, means for energizing an electro-magnetic device acting below the pivot of one pair when the damper has reached a first predetermined position beyond the mid-position in opening and to energize the other electro-magnetic device of the same pair when the damper has reached a second predetermined position in opening and means for energizing the electro-magnetic device acting below the pivot of the other pair when the damper has reached a first predetermined position beyond the mid-position in closing and to energize the other electro-magnetic device of the said other pair when the damper has reached a second predetermined position beyond the mid-position in closing.

ROBERT J. PARSONS.